United States Patent [19]
Blumenthal et al.

[11] Patent Number: 5,893,583
[45] Date of Patent: Apr. 13, 1999

[54] INFLATOR FOR AN INFLATABLE VEHICLE OCCUPANT PROTECTION DEVICE

[75] Inventors: Jack L. Blumenthal, Los Angeles, Calif.; William C. Forbes, Rochester Hills, Mich.; Alex G. Meduvsky, Warren, Mich.; Tracy S. Sparks, Lapeer, Mich.

[73] Assignee: TRW Vehicle Safety Systems Inc., Lyndhurst, Ohio

[21] Appl. No.: 08/842,148

[22] Filed: Apr. 23, 1997

[51] Int. Cl.⁶ .................................................. B60R 21/26
[52] U.S. Cl. ................................... 280/737; 280/741
[58] Field of Search ............................ 280/737, 741

[56] References Cited

U.S. PATENT DOCUMENTS

| | | |
|---|---|---|
| 3,655,217 | 4/1972 | Johnson . |
| 3,788,667 | 1/1974 | Vancil . |
| 4,114,924 | 9/1978 | Kasagi et al. . |
| 4,146,047 | 3/1979 | Wood et al. . |
| 4,690,063 | 9/1987 | Granier et al. .......... 280/741 |
| 5,348,344 | 9/1994 | Blumenthal et al. ........ 280/737 |
| 5,350,193 | 9/1994 | Murashima et al. ........ 280/741 |
| 5,356,176 | 10/1994 | Wells ................... 280/737 |
| 5,368,329 | 11/1994 | Hock ................... 280/741 |
| 5,406,889 | 4/1995 | Letendre et al. ........ 280/741 |
| 5,464,247 | 11/1995 | Rizzi et al. ............ 280/737 |
| 5,494,312 | 2/1996 | Rink .................. 280/737 |
| 5,529,333 | 6/1996 | Rizzi et al. ............ 280/737 |

FOREIGN PATENT DOCUMENTS 1975112939 of 1975 Japan .

*Primary Examiner*—Kenneth R. Rice
*Attorney, Agent, or Firm*—Tarolli, Sundheim, Covell, Tummino & Szabo

[57] ABSTRACT

An apparatus includes a pressure vessel with a closure structure (14) including a part (62) consisting of a single, continuous body of homogeneous metal material. The part (62) has a plurality of fluid outlet openings (22), a fluid outlet conduit (88) communicating with the outlet openings (22), and a pocket (100) separate from the outlet conduit (88). The pocket (100) has a closed inner end (116) defined by a thin wall portion (120) of the part (62). An initiator (40) is received in the pocket (100), and is actuatable to rupture the thin wall portion (120) of the part (62). In a preferred embodiment, a retainer structure (102) holds the initiator (40) in the pocket (100). The retainer structure (102) and the part (62) have adjoining, unthreaded surfaces (160, 108) engaging each other in an interference fit which is tight enough to hold the retainer structure (102) and the initiator (40) in the pocket (100) when the initiator (40) is actuated.

26 Claims, 2 Drawing Sheets

INFLATOR FOR AN INFLATABLE VEHICLE OCCUPANT PROTECTION DEVICE

FIELD OF THE INVENTION

The present invention relates to an inflator, and particularly relates to an inflator for an inflatable vehicle occupant protection device such as an air bag.

BACKGROUND OF THE INVENTION

An inflator for an inflatable vehicle occupant protection device, such as an air bag, may comprise a pressure vessel containing inflation fluid under pressure. Such an inflator is disclosed in U.S. Pat. No. 5,348,344. In the inflator disclosed in the '344 patent, the inflation fluid is an ingredient in a mixture of gases. The mixture of gases further includes a fuel gas which, when ignited, heats the inflation fluid.

The inflator has an igniter containing a small charge of pyrotechnic material. When the air bag is to be inflated, the igniter is actuated electrically. The pyrotechnic material is then ignited and produces combustion products which, in turn, ignite the fuel gas in the pressure vessel.

The fluid pressure inside the pressure vessel is increased by the heat generated upon combustion of the fuel gas. When the increasing fluid pressure reaches a predetermined elevated level, the pressure vessel is opened. The inflation fluid then flows outward from the pressure vessel and into the air bag to inflate the air bag.

SUMMARY OF THE INVENTION

In accordance with the present invention, an apparatus comprises a pressure vessel having a closure structure including a part consisting of a single continuous body of homogeneous metal material. That part of the closure structure has a plurality of fluid outlet openings, a fluid outlet conduit communicating with the outlet openings, and a pocket separate from the outlet conduit. The pocket has a closed inner end defined by a thin wall portion of the part.

The apparatus further comprises an initiator which is received in the pocket. The initiator is actuatable to rupture the thin wall portion of the part.

In a preferred embodiment of the present invention, a retainer structure holds the initiator in the pocket. The retainer structure and the part of the closure structure have adjoining, unthreaded surfaces engaging each other in an interference fit. The interference fit is tight enough to hold the retainer structure and the initiator in the pocket when the initiator is actuated.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENT

Figure 1:
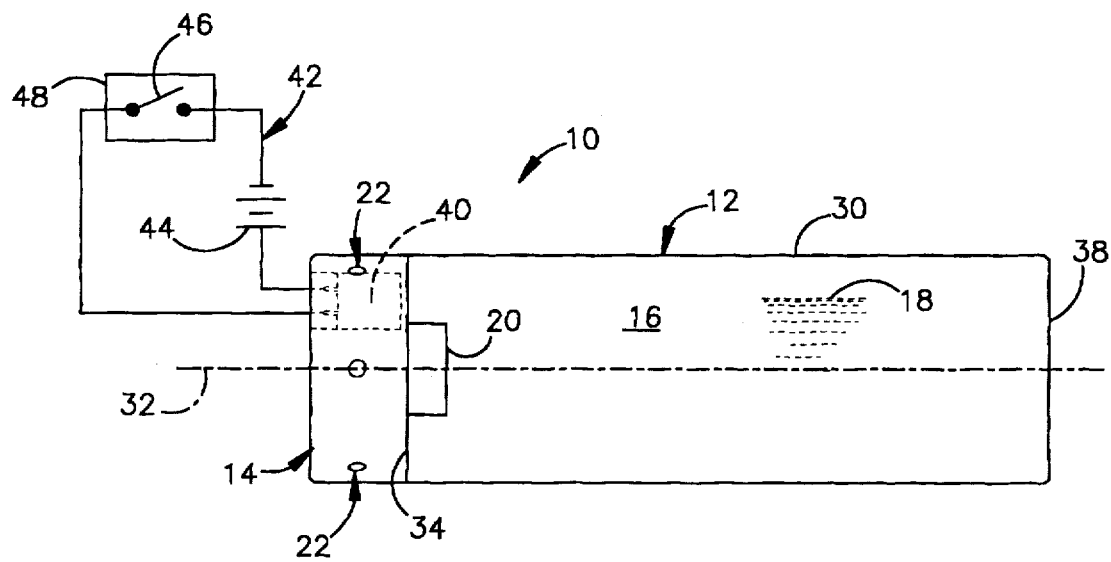
FIG. 1 is a schematic view of an inflator and an electrical circuit comprising a first embodiment of the present invention.

An inflator 10 comprising a first embodiment of the present invention is shown schematically in FIG. 1. The inflator 10 comprises a pressure vessel including a tank 12, which is sometimes referred to as a bottle, and a closure structure 14 which closes the tank 12. The tank 12 has a storage chamber 16 containing fluid 18 under pressure. In the first embodiment of the present invention, the closure structure 14 is a cap with a rupturable closure wall 20. The closure wall 20 is subjected to the pressure in the storage chamber 16, and blocks the fluid 18 from flowing out of the storage chamber 16. When the pressure vessel 10 is opened, the closure wall 20 is ruptured and the fluid 18 is released to flow out of the storage chamber 16 past the closure wall 20. The fluid 18 then flows outward from the cap 14 through a plurality of outlet openings 22.

As an example of a tank that can be used in accordance with the present invention, the tank 12 shown in the drawings has an elongated cylindrical body wall 30 with a longitudinal central axis 32. An annular outer end surface 34 of the body wall 30 defines a circular open end 36 (FIG. 2) of the tank 12. The body wall 30 has a substantially constant diameter, and extends along the entire length of the tank 12 between a circular end wall 38 and the open end 36. The tank 12 may be formed of steel, but is preferably formed of material comprised at least substantially of aluminum, i.e., aluminum or an aluminum alloy, for low weight and cost. For example, 6061 Alloy is especially suitable for the tank 12.

The fluid 18 contained under pressure in the storage chamber 16 preferably comprises inflation fluid for an inflatable vehicle occupant protection device (not shown) such as an air bag. The inflation fluid preferably includes a combustible mixture of gases including a primary gas and a fuel gas. The primary gas comprises the majority of the inflation fluid that inflates the air bag 12. The fuel gas, when ignited, heats the primary gas. The combustible mixture of gases most preferably has a composition in accordance with the invention set forth in U.S. Pat. No. 5,348,344, to Blumenthal et al., entitled APPARATUS FOR INFLATING A VEHICLE OCCUPANT RESTRAINT USING A MIXTURE OF GASES, and assigned to TRW Vehicle Safety Systems Inc. Accordingly, the primary gas most preferably includes an inert gas for inflating the air bag and an oxidizer gas for supporting combustion of the fuel gas. The primary gas may include air, an inert gas, or a mixture of air and an inert gas. The inert gas may be nitrogen, argon or a mixture of nitrogen and argon. For example, the primary gas may be air, with the oxidizer gas being the oxygen in the air. The fuel gas may be hydrogen, methane, or a mixture of hydrogen and methane. Preferably, the fuel gas is hydrogen. A preferred composition of the mixture of gases is about 12% by volume hydrogen and about 88% by volume air. Although the storage pressure may vary, it is preferably within the range of approximately 1,500 psig to approximately 5,000 psig., and is most preferably approximately 2,500 psig.

The inflator 10 further includes an initiator 40 which functions to ignite the combustible mixture of gases 18 in the storage chamber 16. As shown schematically in FIG. 1, the initiator 40 is located within the cap 14, and is connected in an electrical circuit 42. The electrical circuit 42 includes a power source 44, which is preferably a vehicle battery and/or a capacitor, and a normally open switch 46. The switch 46 is part of a sensor 48 which senses a vehicle condition indicating the occurrence of a collision. The collision-indicating condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the air bag or other vehicle occupant protection device is desired to help protect an occupant of the vehicle.

When the sensor 48 senses a collision-indicating condition at or above the predetermined threshold level, the switch 46 closes and the initiator 40 is actuated electrically. The initiator 40 then ignites the fuel gas in the mixture of gases 18 in the storage chamber 16. The heat generated by combustion of the fuel gas increases the fluid pressure in the storage chamber 16. When the increasing fluid pressure reaches a predetermined elevated level, it ruptures the closure wall 20. The mixture of gases 18 is thus released to flow outward from the storage chamber 16 through the cap 14, and further outward from the inflator 10 through the outlet openings 22. As described in the '344 patent noted above, the fuel gas is substantially consumed by combustion so that the vehicle occupant protection device is inflated by inflation gas consisting essentially of the inert gas and any remaining oxidizer gas in the mixture of gases 18.

Figure 2:
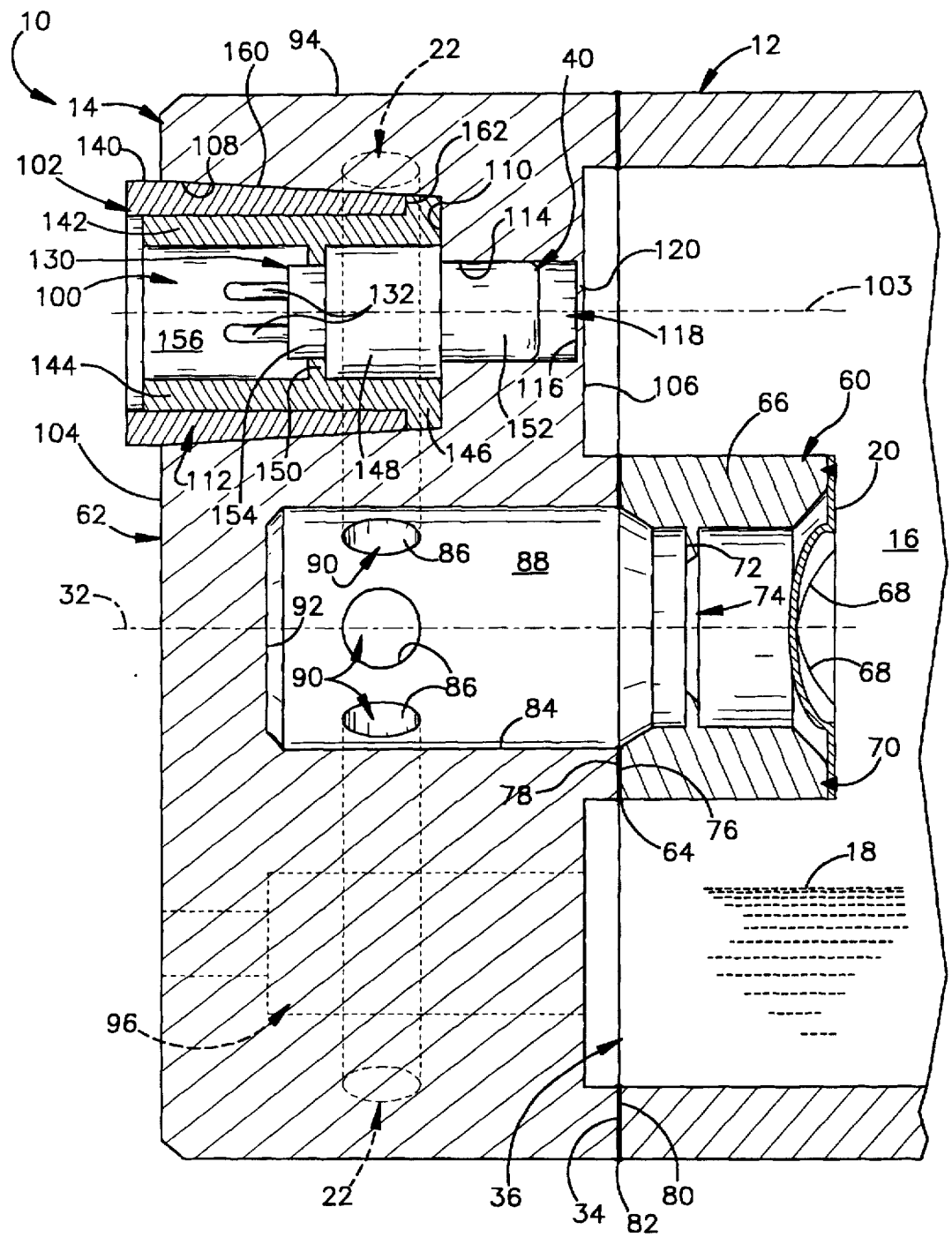
FIG. 2 is a schematic, partial sectional view of parts of the inflator shown in FIG. 1.

As shown in greater detail in FIG. 2, the cap 14 includes inner and outer cap parts 60 and 62. A friction weld 64 fixes and seals the two cap parts 60 and 62 together. The friction weld 64 preferably is an inertia weld. However, another type of friction weld, such as a conventional friction weld or a flywheel friction weld, can be used as an alternative.

The inner cap part 60 is defined by interconnected pieces of steel, namely, the closure wall 20 and a support ring 66. The closure wall 20 may have any suitable structure known in the art. As an example of a closure wall that can be used in accordance with the present invention, the closure wall 20 in the first embodiment is a burst disk with a plurality of radially extending score lines 68. The burst disk 20 ruptures along the score lines 68 when the fluid pressure in the storage chamber 16 reaches the predetermined elevated level as a result of combustion of the fuel gas in the mixture of gases 18. Such a burst disk is known in the art. A circumferentially extending weld 70 fixes and seals the burst disk 20 and the support ring 66 concentrically together. A radially projecting, annular inner wall portion 72 of the support ring 66 defines a circular control orifice 74 which is spaced from the burst disk 20 and centered on the axis 32. Preferred materials for the burst disk 20 and the support ring 66 include Type 304L and Type 316L stainless steel.

The outer cap part 62 is preferably constructed as a single continuous body of metal material. The metal material of the outer cap part 62 is preferably the same as the metal material of the tank 12. The outer cap part 62 in the first embodiment of the present invention is thus formed of material comprised at least substantially of aluminum, with 6061 Alloy being most preferable. A first annular inner end surface 76 of the outer cap part 62 is centered on the axis 32, and abuts a coextensive annular outer end surface 78 of the support ring 66. The inertia weld 64 joins the inner end surface 76 to the outer end surface 78.

After the inner and outer cap parts 60 and 62 have been interconnected by the inertia weld 64, the cap 14 is mounted on the body wall 30 of the tank 12 to close the open end 36 of the tank 12. Specifically, a second annular inner end surface 80 of the outer cap part 62 is moved into abutment with the annular outer end surface 34 of the body wall 30. Another friction weld 82, which also is preferably an inertia weld, is then formed to join the abutting surfaces 80 and 34 together. The cap 14 and the tank 12 are thus fixed and sealed to each other circumferentially entirely around the axis 32.

The outer cap part 62 has a major cylindrical inner surface 84 and a plurality of minor cylindrical inner surfaces 86. The cylindrical inner surfaces 84 and 86 respectively define an outlet conduit 88 and a plurality of outlet passages 90. The conduit 88 extends axially from the annular surface 76 to a circular inner surface 92. The passages 90 extend radially from the conduit 88 to the outlet openings 22. Preferably, the inner surfaces 84, 86, and 92 of the outer cap part 62 are anodized for increased resistance to oxidation under the influence of the heat generated by combustion of the combustible mixture of gases 18. A cylindrical outer surface 94 of the outer cap part 62 also may be anodized for increased resistance to oxidation around the outlet openings 22.

An inlet passage 96 extends through the outer cap part 62. The inlet passage 96 contains a check valve or the like (not shown) for filling the tank 12 with the mixture of gases 18. Such an inlet apparatus is known in the art. When the tank 12 has been filled with the mixture of gases 18, the fluid pressure in the storage chamber 16 acts axially outward against the cap 14, i.e., in a direction extending from right to left in FIG. 2. This induces stress in the inertia welds 64 and 82. The stress induced in the inertia weld 82 consists essentially of tensile and shear stress. The similar materials (aluminum or aluminum alloys) of the tank 12 and the outer cap part 62 help to ensure that the inertia weld 82 will be strong enough to withstand such stress. On the other hand, the stress induced in the inertia weld 64 consists essentially of compressive stress. Although the inner and outer cap parts 60 and 62 are formed of dissimilar materials (steel and aluminum or aluminum alloys), the compressive stressing of the weld 64 helps to ensure that the cap parts 60 and 62 remain securely fixed and sealed to each other.

The outer cap part 62 further has a pocket 100 which is separate from the outlet conduit 88 and the outlet passages 90. The initiator 40 is located within the pocket 100, and is held in the pocket 100 by a retainer structure 102.

The pocket 100 has a generally cylindrical shape centered on an axis 103 parallel to the central axis 32, and has a depth extending from an outer side surface 104 of the outer cap part 62 toward an inner side surface 106. A frustoconical inner surface 108 extends axially and radially inward from the outer side surface 104 to an annular inner shoulder surface 110. The frustoconical inner surface 108 thus defines the length and diameter of a tapered, generally cylindrical outer section 112 of the pocket 100.

A reduced diameter, cylindrical inner surface 114 extends axially inward from the shoulder surface 110 to a circular inner end surface 116. The cylindrical inner surface 114 thus defines the length and diameter of a cylindrical inner section 118 of the pocket 100. The inner end surface 116 is located on a thin wall portion 120 of the second cap part 62. The thin wall portion 120 has a thickness extending axially between the inner end surface 116 and the inner side surface 106, and is subjected to the fluid storage pressure acting outward against the outer cap part 62 at the inner side surface 106.

The initiator 40 in the first embodiment of the present invention is a conventional automotive squib with a cylindrical casing 130 and a pair of electrodes 132 projecting from the casing 130. A small charge of pyrotechnic material is contained in the casing 130. The pyrotechnic material is ignited in a known manner upon the passage of electric current through the initiator 40 between the electrodes 132.

The retainer structure 102 includes first and second metal retainer parts 140 and 142, each of which is preferably formed of the same material as the outer cap part 62. The second retainer part 142 has a tubular cylindrical body wall 144 with a radially outwardly projecting flange 146 at its inner end. The flange 146 abuts the outer cap part 62 at the frustoconical inner surface 108 and the inner shoulder surface 110. An intermediate portion 148 of the initiator casing 130 is closely surrounded by the body wall 144, and is engaged axially between the shoulder surface 110 and a radially inwardly projecting, annular inner wall portion 150 of the second retainer part 142. A narrow portion 152 of the casing 130 projects axially inward from the intermediate portion 148, and is closely received within the inner section 118 of the pocket 100. Another narrow portion 154 of the casing 130 projects axially outward from the intermediate portion 148, and is closely surrounded by the annular inner wall portion 150 of the second retainer part 142. The electrodes 134 are located within a socket 156 defined by the second retainer part 142.

The first retainer part 140 is a tapered tube with a cylindrical inner peripheral surface and a frustoconical outer peripheral surface 160. The first retainer part 140 is closely received concentrically over the body wall 144 of the second retainer part 142. The frustoconical peripheral surface 160 of the first retainer part 140 adjoins the frustoconical inner surface 108 of the outer cap part 62 in an interference fit. The interference fit holds the first retainer part 140 in the pocket 100. An annular inner end surface 162 of the first retainer part 140 abuts the second retainer part 142 at the flange 146 of the second retainer part 142. The first retainer part 140 thus blocks movement of the second retainer part 142 outward of the pocket 100. The second retainer part 142, which engages the initiator 40 in the closely interfitting configuration described above, blocks movement of the initiator 40 outward of the pocket 100 relative to the first retainer part 140.

When the switch 46 (FIG. 1) in the electrical circuit 42 closes, electric current is directed through the initiator 40 between the electrodes 132. The charge of pyrotechnic material in the casing 130 is then ignited and produces combustion products which are spewed from the narrow portion 152 of the casing 130 into the inner pocket section 118. The resulting heat and fluid pressure in the inner pocket section 118 act directly on the thin wall portion 120 of the outer cap part 62 and increase to levels which cause the thin wall portion 120 to rupture. The combustion products are then spewed into the storage chamber 16 to ignite the fuel gas in the combustible mixture of gases 18.

Importantly, the interference fit between the adjoining frustoconical surfaces 108 and 160 is tight enough to hold the retainer structure 102 and the initiator 40 in the pocket 100 against the forces of the increasing fluid pressure developed by the combustion products in the inner pocket section 118. In a test apparatus, such interference fits have been found to resist the forces of outwardly directed pressures up to about 41,000 to 56,000 psi. Since the thin wall portion 120 of the outer cap part 62 would burst under the force of a pressure of about 20,000 psi, interference fits used in accordance with the present invention will remain secure in inflators like the inflator 10. This feature of the present invention enables an inflator to be constructed without the use of other more costly and complex structures such as screw threads, welds, and/or crimped rim walls that are commonly used to interconnect corresponding parts of the inflator. The interference fit, as well as the closely interfitting configurations of the initiator 40, the outer cap part 62 and the retainer parts 140 and 142, also blocks the fluid contents of the inner pocket section 118 and the storage chamber 16 from leaking outward from the inflator 10 through the pocket 100.

Figure 3:
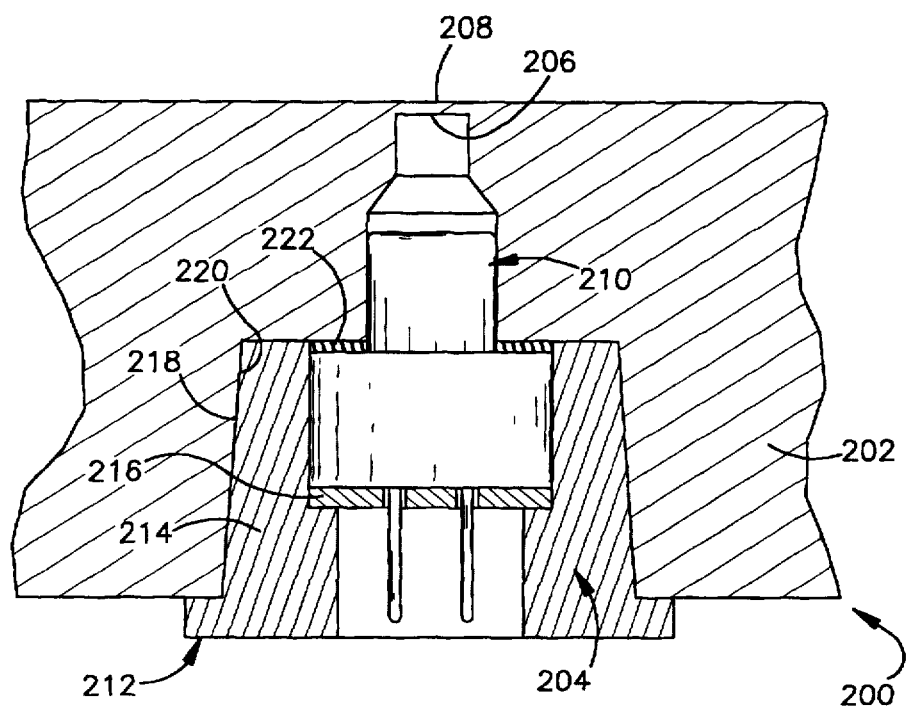
FIG. 3 is a view similar to FIG. 2 showing parts of an inflator comprising a second embodiment of the present invention.

A second embodiment of the present invention is shown partially in FIG. 3. The second embodiment includes an inflator 200 which, like the inflator 10 described above, comprises a pressure vessel with a closure part 202 consisting of a single continuous body of homogeneous metal material. The closure part 202 has a pocket 204 with a closed inner end 206 defined by a thin wall portion 208 of the closure part 202. An initiator 210 is received in the pocket 204, and is actuatable to rupture the thin wall portion 208 of the closure part 202. A retainer structure 212 holds the initiator 210 in the pocket 204.

The retainer structure 212 includes first and second retainer parts 214 and 216. The first retainer part 214 is a tubular part substantially similar to the first retainer part 140 described above. The first retainer part 214 thus has a frustoconical peripheral surface 218 adjoining a frustoconical inner surface 220 of the closure part 202 in an interference fit. The interference fit is tight enough to hold the retainer structure 212 and the initiator 210 in the pocket 204 when the initiator 210 is actuated.

The first and second retainer parts 214 and 216, the initiator 40, and the closure part 202 in the second embodiment of the present invention have closely interfitting configurations that block movement of the initiator 210, as well as leakage of fluid, outward through the pocket 204. However, the second retainer part 216 in the second embodiment is shaped as a flat circular washer rather than a cylindrical tube. An optional elastomeric seal 222 also is included in the second embodiment to block fluid from leaking outward through the pocket 204.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a pressure vessel having a closure structure including a part consisting of a single continuous body of homogeneous metal material, said part having a plurality of fluid outlet openings, a fluid outlet conduit communicating with said outlet openings, and a pocket separate from said outlet conduit, said pocket having a closed inner end defined by a thin wall portion of said part; and an initiator received in said pocket, said initiator being actuatable to rupture said thin wall portion of said part.

2. Apparatus as defined in claim 1 wherein said pressure vessel contains inflation fluid under pressure, said thin wall portion of said part being subjected to said pressure.

3. Apparatus as defined in claim 2 wherein said pressure vessel further contains ignitable material for heating said inflation fluid.

4. Apparatus as defined in claim 3 wherein said ignitable material comprises fuel gas.

5. Apparatus as defined in claim 4 wherein said fuel gas is stored in said pressure vessel prior to actuation of said initiator.

6. Apparatus as defined in claim 5 wherein said fuel gas is a portion of a combustible mixture of gases which is stored in said pressure vessel prior to actuation of said initiator.

7. Apparatus as defined in claim 1 further comprising a retainer structure holding said initiator in said pocket, said retainer structure and said part having adjoining unthreaded surfaces engaging each other in an interference fit tight enough to hold said retainer structure and said initiator in said pocket when said initiator is actuated.

8. Apparatus as defined in claim 7 wherein said initiator, when actuated, emits pyrotechnic combustion products that cause said thin wall portion of said part to be ruptured and that develop fluid pressure forces urging said initiator to move outward from said pocket, said interference fit being tight enough to hold said retainer structure and said initiator in said pocket against said fluid pressure forces.

9. Apparatus as defined in claim 8 wherein said combustion products act directly against said thin wall portion of said part to rupture said thin wall portion.

10. Apparatus as defined in claim 8 wherein said adjoining unthreaded surfaces are frustoconical and are tapered radially inward in a direction extending inward of said pocket.

11. Apparatus as defined in claim 10 wherein said retainer structure comprises first and second retainer parts, said first retainer part being tubular and having one of said frustoconical surfaces, said second retainer part having a configuration interposed between said initiator and said first retainer part which blocks movement of said initiator outward of said pocket relative to said first retainer part.

12. Apparatus as defined in claim 1 wherein said pressure vessel further has a cylindrical tank with an annular outer end surface defining an open end of said tank, said part of said closure structure having an annular inner end surface and being fixed and sealed to said tank by a friction weld between said end surfaces.

13. Apparatus as defined in claim 12 wherein said part of said closure structure and said tank are both formed of material comprised at least substantially of aluminum.

14. Apparatus comprising:
   a pressure vessel having a part consisting of a single continuous body of homogenous metal material, said part having a pocket with a closed inner end defined by a thin wall portion of said part;
   an initiator received in said pocket, said initiator being actuatable to rupture said thin wall portion of said part; and
   a retainer structure holding said initiator in said pocket, said retainer structure and said part having adjoining unthreaded surfaces engaging each other in an interference fit tight enough to hold said retainer structure and said initiator in said pocket when said initiator is actuated.

15. Apparatus as defined in claim 14 wherein said pressure vessel contains inflation fluid under pressure, said thin wall portion of said part being subjected to said pressure.

16. Apparatus as defined in claim 15 wherein said pressure vessel further contains ignitable material for heating said inflation fluid.

17. Apparatus as defined in claim 16 wherein said ignitable material comprises fuel gas.

18. Apparatus as defined in claim 17 wherein said fuel gas is stored in said pressure vessel prior to actuation of said initiator.

19. Apparatus as defined in claim 18 wherein said fuel gas is a portion of a combustible mixture of gases which is stored in said pressure vessel prior to actuation of said initiator.

20. Apparatus as defined in claim 14 wherein said initiator, when actuated, emits pyrotechnic combustion products that cause said thin wall portion of said part to be ruptured and that develop fluid pressure forces urging said initiator to move outward from said pocket, said interference fit being tight enough to hold said retainer structure and said initiator in said pocket against said fluid pressure forces.

21. Apparatus as defined in claim 20 wherein said pyrotechnic combustion products act directly against said thin wall portion of said part to rupture said thin wall portion.

22. Apparatus as defined in claim 20 wherein said adjoining unthreaded surfaces are frustoconical and are tapered radially inward in a direction extending inward of said pocket.

23. Apparatus as defined in claim 22 wherein said retainer structure comprises first and second retainer parts, said first retainer part being tubular and having one of said frustoconical surfaces, said second retainer part having a configuration interposed between said initiator and said first retainer part which blocks movement of said initiator outward of said pocket relative to said first retainer part.

24. Apparatus as defined in claim 14 wherein said pressure vessel further has a cylindrical tank with an annular outer end surface defining an open end of said tank, said part having an annular inner end surface and being fixed and sealed to said tank by a friction weld between said end surfaces.

25. Apparatus as defined in claim 24 wherein said part and said tank are both formed of material comprised at least substantially of aluminum.

26. Apparatus as defined in claim 24 wherein said part further has a plurality of fluid outlet openings and a fluid outlet conduit communicating with said outlet openings, said pocket being separate from said outlet conduit.

* * * * *